(12) United States Patent
Ishibashi et al.

(10) Patent No.: US 11,787,284 B2
(45) Date of Patent: Oct. 17, 2023

(54) FRONT GRILLE

(71) Applicant: TOYOTA JIDOSHA KABUSHIKI KAISHA, Toyota (JP)

(72) Inventors: Takuya Ishibashi, Nisshin (JP); Shogo Okamoto, Antibes Alpes-Maritimes (FR)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 39 days.

(21) Appl. No.: 17/665,728

(22) Filed: Feb. 7, 2022

(65) Prior Publication Data
US 2022/0250463 A1    Aug. 11, 2022

(30) Foreign Application Priority Data

Feb. 10, 2021 (JP) .................................. 2021-020019

(51) Int. Cl.
*B60K 11/08* (2006.01)
*B60R 19/52* (2006.01)

(52) U.S. Cl.
CPC .............. *B60K 11/08* (2013.01); *B60R 19/52* (2013.01)

(58) Field of Classification Search
CPC ... B60K 11/08; B60R 19/52; B60R 2019/522; B60R 2019/525
See application file for complete search history.

(56) References Cited

U.S. PATENT DOCUMENTS

2015/0210235 A1     7/2015  Maji et al.
2019/0077250 A1*    3/2019  Yoon ...................... B60K 11/08

FOREIGN PATENT DOCUMENTS

JP      2015-140153 A     8/2015
JP      2017-137889 A     8/2017

\* cited by examiner

*Primary Examiner* — Jacob M Amick
(74) *Attorney, Agent, or Firm* — Dinsmore & Shohl LLP

(57) ABSTRACT

A front grille includes a plurality of grille elements arranged in a vehicle width direction and in a vertical direction so as to form a mesh pattern, and each of the plurality of grille elements includes a pair of longitudinal walls extending along the vertical direction and separated from each other in the vehicle width direction, and a lateral wall for connecting lower ends of the pair of the longitudinal walls to each other. The lateral wall has a forwardly descending inclination with a front end being located lower than a rear end.

11 Claims, 2 Drawing Sheets

FRONT GRILLE

CROSS REFERENCE TO RELATED APPLICATION

This application claims priority to Japanese Patent Application No. 2021-020019 filed on Feb. 10, 2021, which is incorporated herein by reference in its entirety including the specification, claims, drawings, and abstract.

TECHNICAL FIELD

The present disclosure discloses a front grille disposed on a front surface of a vehicle.

BACKGROUND

A space referred to as a power unit compartment is formed below a hood of a vehicle, and power sources (such as, for example, an engine and a motor) and a radiator are installed in the power unit compartment. Further, a front surface of the vehicle has a front grille which is a component in which a plurality of openings are defined piercing through the front grille along a longitudinal direction of the vehicle. The front grille functions to direct travel wind to the radiator. Further, the front grille is arranged at a very conspicuous location among other locations on the vehicle, and thus has a profound effect on an aesthetic impression of the vehicle. For this reason, a variety of designs have been suggested, for the front grille, taking into account an aesthetic aspect in addition to the functionality of the front grille. For example, JP 2015-140153 A (Patent Document 1) discloses a front grille in which lateral fins extending along a vehicle width direction and vertical fins extending along a vertical direction are arranged in a latticed pattern.

CITATION LIST

Patent Literature

Patent Document 1: JP 2015-140153 A

Conventional front grills, however, often have a flat design. For example, in the front grille of Patent Document 1, both the lateral fins and the vertical fins constituting the front grille are formed in thin plate shapes, and the lateral fins are arranged substantially parallel with the horizontal plane while the vertical fins are arranged substantially parallel with the plumb plane. For this reason, only front edges of the vertical and lateral fins are viewable to a viewer standing in front of the vehicle, which gives the viewer an impression that the front grille lacks depth and has a flat form.

Under these circumstances, the present disclosure discloses a front grille which can give a viewer an impression that the front grille has a deep three-dimensional appearance.

SUMMARY

In an aspect of this disclosure, a front grille including a plurality of grille elements which are arranged in a vehicle width direction and in a vertical direction so as to form a mesh pattern is disclosed, in which each of the plurality of grille elements includes a pair of longitudinal walls extending along the vertical direction and spaced from each other in the vehicle width direction, and a lateral wall configured to connect lower ends of the pair of longitudinal walls to each other, the lateral wall having a forwardly descending inclination with a front part located lower than a rear end.

The lateral wall having the forwardly descending inclination can give a viewer an impression that the front grille has a deep three-dimensional appearance.

In an aspect of this disclosure, the lateral wall may be composed of a plurality of wall pieces connected at an angle to each other.

When configured as described above, which one of the plurality of wall pieces is most noticeable will change depending on locations of the viewer. This can reinforce the impression of the deep three-dimensional appearance that is given to the viewer.

In an aspect of this disclosure, the lateral wall may include a first wall piece extending substantially along the vehicle width direction and a pair of second wall pieces extending obliquely upward from both ends, in the vehicle width direction, of the first wall piece, respectively.

When configured as described above, visibly perceptible appearances of the grille elements change as the viewer moves along the vehicle width direction. This can also reinforce the impression of the deep three-dimension appearance that is given to the viewer.

In another aspect of this disclosure, vertical dimensions of the grille elements may vary depending on vertical positions of the grille elements within the front grille.

In this way, an elaborated and deep aesthetic appearance of the front grille can be presented to the viewer.

In an aspect of this disclosure, inclinations of the longitudinal walls of the grille elements relative to a plumb line may vary depending on positions, in the vehicle width direction, of the grille elements within the front grille.

Also in this way, the elaborated and deep aesthetic appearance of the front grille can be presented to the viewer.

In another aspect of this disclosure, the plurality of grille elements may be arranged in a staggered pattern in which, among the plurality of grille elements, grille elements in a single tier may be connected to grille elements in a lower tier located one tier below the single tier in such a manner that an upper end of a longitudinal wall of each of the grille elements in the lower tier is connected to a substantial center of a lateral wall of each of the grille elements in the one tier.

When configured as described above, a viewer's eye is easily drawn not only up and down but also side to side, which can contribute to the elaborate and deep aesthetic appearance of the front grill that is presented to the viewer.

In another aspect of this disclosure, the front grille may be composed of a single plate member in which all of the plurality of grille elements are connected.

When configured as described above, an increase in a component count, and thus an increase in cost of manufacturing the front grille, can be prevented.

According to the present disclosure, the impression that the front grille has the deep three-dimensional appearance can be given to viewers.

BRIEF DESCRIPTION OF DRAWINGS

Embodiments of the present disclosure will be described based on the following figures, wherein.

DESCRIPTION OF EMBODIMENTS

Figure 1:
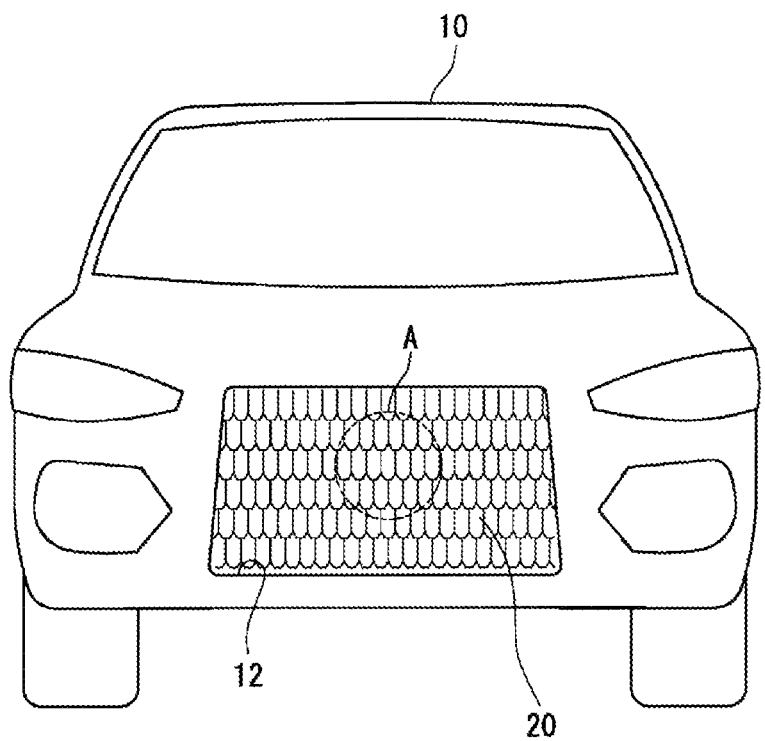
FIG. 1 is a schematic front view of a vehicle.
Figure 2:
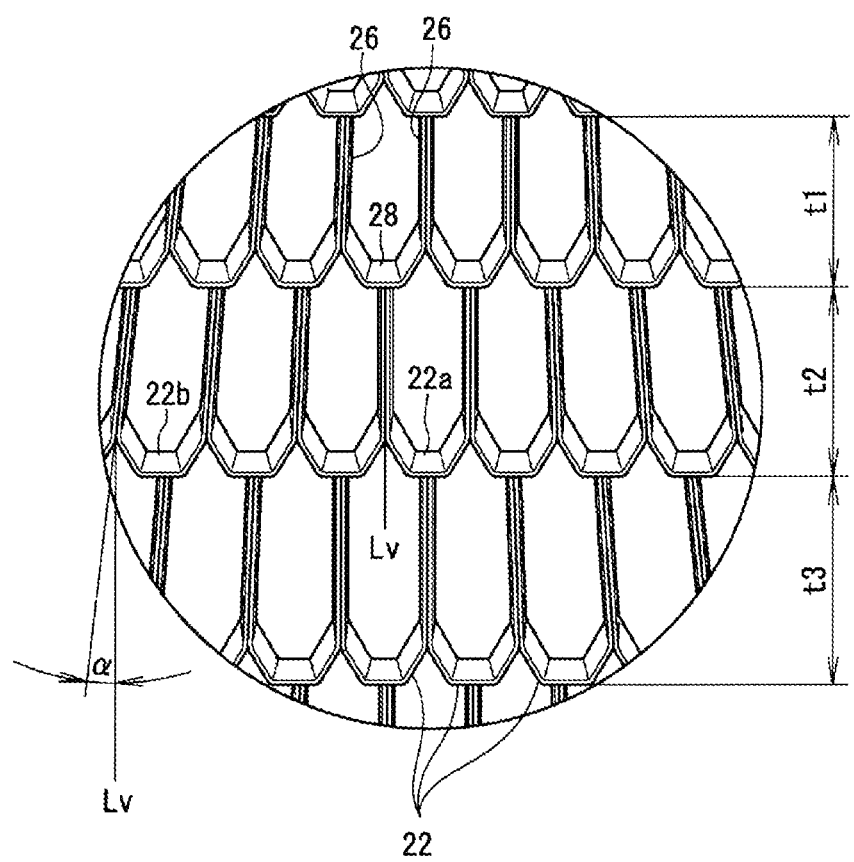
FIG. 2 is an enlarged view of part A indicated in FIG. 1.

Hereinafter, a configuration of a front grille 20 is explained with reference to the drawings. FIG. 1 is a schematic front view of a vehicle 10, and FIG. 2 is an enlarged view of part A indicated in FIG. 1. As shown in FIG. 1 or as is well known, a grille opening 12 is defined in a front surface of the vehicle 10, and a mesh member which is referred to as a front grille 20 is fitted in the grille opening 12. The shape of the grille opening 12 is changed as appropriate for each vehicle model. In the example of FIG. 1, the grille opening 12 is formed into a trapezoidal shape whose width becomes broader toward a lower part.

Figure 3:
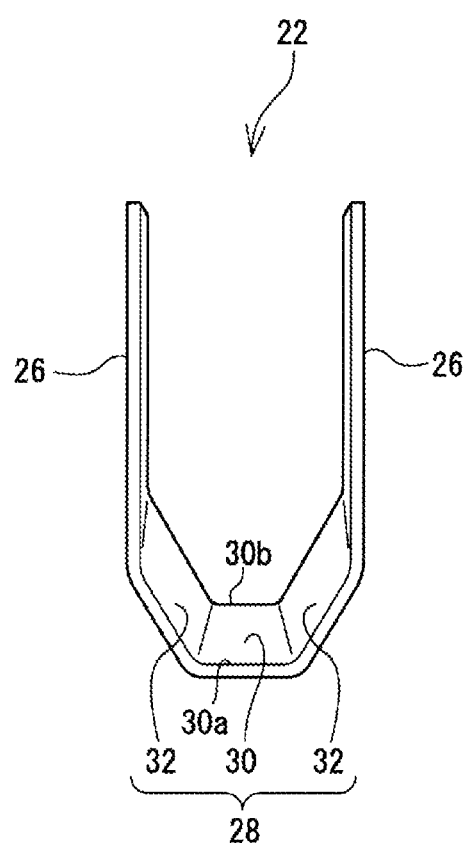
FIG. 3 is a front view of a grille element.

The front grille 20 includes, as shown in FIG. 2, grille elements 22 which are arranged along a vehicle width direction and along a vertical direction so as to form an approximate mesh pattern as a whole. FIG. 3 is a front view of one grille element 22. As shown in FIG. 3, the grille element 22 has a substantial U-letter shape composed of a pair of longitudinal walls 26 extending along the vertical direction and a lateral wall 28 for connecting lower ends of the pair of longitudinal walls 26 to each other.

Further, as shown in FIG. 2, the grille elements 22 are arranged in a staggered pattern to realize different topologies of grille elements 22 in the vehicle width direction between tiers. Accordingly, grille elements 22 arranged in one tier are connected to grille elements 22 in a lower tier located one tier below the one tier in such a manner that an upper end of a longitudinal wall 26 of each of the grille elements 22 in the lower tier is connected to a substantial center of a lateral wall 28 of each of the grille elements 22 in the one tier. Further, grille elements 22 that are adjacent in the vehicle width direction are connected without a gap intervening therebetween. For example, a right longitudinal wall 26 of a grille element 22 is adjoined without a gap to a left longitudinal wall 26 of an adjacent grille element 22 located toward the right side.

The front grille 20 including the above-described grille elements 22 is formed of a single plate member which is pressed or injection molded. In other words, the grille elements 22 constitute a single component in which the grille elements 22 are always connected to each other without being separated during manufacturing processes. The front grille 20 composed of the single plate member can lead to a reduced part count and thus reduced manufacturing costs. Meanwhile, a groove trace is formed on a location corresponding to each of boundaries between adjacent grille elements 22. The grill elements 22 configured as described above give a viewer an impression that the grille elements 22 are independent separate parts. Such an impression can exert on the viewer an effect that the front grille 20 appears to be formed by combining a plurality of parts, and accordingly adds an upscale appearance to the front grille 20.

Next, a configuration of the grille element 22 is explained. As described above, the grille element 22 has the pair of longitudinal walls 26 and the lateral wall 28 for connecting the lower ends of the pair of the longitudinal walls 26 to each other. Wall surfaces of the longitudinal walls 26 (surfaces perpendicular to the thickness direction of the longitudinal walls 26) are substantially parallel with a vehicle length direction. For this reason, when the front grille 20 is viewed from a position just in front of the front grille 20, the viewer is hardly able to see the wall surfaces of the longitudinal walls 26, and sees only front ends (i.e., edges) of the longitudinal walls 26. The longitudinal walls 26 accordingly cause the viewer to pay attention to a vertical line.

On the other hand, the lateral wall 28 has a forwardly descending inclination with a front end 30a located lower than a rear end 30b. As a result, when viewing the front grille 20 from the position just in front thereof, the viewer is able to see, in addition to the front end 30a of the lateral wall 28, a wall surface of the lateral wall 28 (i.e., a surface perpendicular to the thickness direction of the lateral wall 28). This allows the viewer to be aware of depth of the front grill 20. In other words, this form of the lateral wall 28 having the forwardly descending inclination can create a deep three-dimensional appearance of the front grille 20. In addition, because the grille element 22 has a height greater than a width along the vehicle width direction, the longitudinal wall 26 is more conspicuous than the lateral wall 28, which would, in general, result in emphasis being placed on a line of the grille element 22 along a height direction, i.e., the vertical line. However, in this example, the lateral wall 28 is formed in a forwardly descending shape and is accordingly given a deep appearance, which makes the lateral wall 28 no less noticeable than the longitudinal wall 26. In this way, the viewer is caused to pay attention to a lateral line as well as the vertical line. Here, the vertical line is a two-dimensionally extending line composed of front edges of the longitudinal wall 26 only, while the lateral line is a three-dimensionally extending line composed of a contour of a forwardly descending wall surface of the lateral wall 28. When the vertical and lateral lines are changed in formation, a deep and elaborate aesthetic appearance of the front grille 20 can be given to the viewer. It should be noted that an angle of inclination of the lateral wall 28 relative to the horizontal plane is not limited to a particular angle, but it must be an angle which can create a state where the wall surface of the lateral wall 28 is sufficiently visible from a position forward the vehicle. Therefore, the angle of inclination of the lateral wall 28 may be an angle of 30 degrees or greater, 45 degrees or greater, or 70 degrees or greater at the width center of the lateral wall 28 in the vehicle width direction. Because the term "angle of inclination" as used herein denotes the angle of inclination relative to the horizontal plane, an angle of inclination of 0 degrees means a state of being parallel with the horizontal plane, while an angle of inclination of 90 degrees means a state of being parallel with the plumb plane.

Meanwhile, the lateral wall 28, which is designed to be forwardly descending, or conversely rearwardly ascending, can create a current of air along a vehicle vertical direction. That is, a lateral wall 28, which is designed to extend substantially horizontally, cannot create the current of air along the vertical direction, while a lateral wall 28, which is designed to be rearwardly ascending as in the case of this example, can direct the current of air to pass through the front grille 20 along an oblique upward direction while flowing upward and toward a rear part of the front grille 20. Then, in a case where the radiator is installed at a position above the lower end of the front grille 20, a cooling efficiency of the radiator can be improved by the current of air that is directed to flow along the oblique upward direction.

The lateral wall 28 further includes, as shown in FIG. 3, a first wall piece 30 extending substantially along the vehicle width direction and a pair of second wall pieces 32 respectively extending along the oblique upward direction from both ends, in the vehicle width direction, of the first wall piece 30. In other words, the lateral wall 28 is composed of a plurality of wall pieces 30 and 32 which are connected to each other at an angle. When the lateral wall 28 is configured in this way, a visibly perceptible appearance of the front grille 20 changes depending on locations of the viewer. For example, as the viewer moves from a location in front of the center of the front grille 20 toward the right side, visible areas on the surface of the second wall piece 32 on the right side and the surface of the first wall piece 30 gradually diminish while a visible area on the surface of the second wall piece 32 on the left side gradually becomes greater. In this way, the visibly perceptible appearance of the front grille 20 varies depending on the locations of the viewer, which can reinforce the impression that the front grille 20 has the deep three-dimensional appearance that is given to the viewer.

Further, in this example, the grille elements 22 are slightly changed in their shapes based on placed positions of the grille elements 22. Specifically, in this example, height dimensions of the grille elements 22 are increased as the grille elements 22 are disposed at lower positions. In FIG. 2, for example, when the height of grille elements 22 in an n-th tier is defined as t1, the height of grille elements 22 in an (n+1)-th tier located one tier below the n-th tier is defined as t2, and the height of grille elements 22 in an (n+2)-th tier located one tier below the (n+1)-th tier is defined as t3, the heights t1, t2, and t3 are changed for each of the tiers where the grille elements 22 are placed, so as to establish the following relationship: t1<t2<t3.

Still further, in this example, inclinations of the longitudinal walls 26 of the grille elements 22 relative to a plumb line Lv are increased toward an outer end in the vehicle width direction. For example, in FIG. 2, the inclination of the longitudinal wall 26 relative to the plumb line Lv is almost zero in a grille element 22a located approximately at the center of the front grille 20. On the other hand, the longitudinal wall 26 of a grille element 22b located outward of the center in the vehicle width direction is inclined at an angle α relative to the plumb line Lv in such a manner that an upper end of the longitudinal wall 26 is shifted inward in the vehicle width direction from a lower end. When the shapes of the grille elements 22 are gradually changed based on the placed positions as described above, a deeper and more elaborate aesthetic appearance of the front grille 20 can be presented to the viewer.

As is evident from the above explanation, the front grille 20 in this example can give the viewer the impression that the front grille 20 has the deep three-dimensional appearance, the deep and elaborate appearance, and the upscale appearance. It should be noted that the above-described configurations are presented by way of illustration, and may be changed, other than a feature that the front grille 20 includes a plurality of grille elements 22 arranged in the vertical and lateral directions, and each of the grille elements 22 includes the pair of longitudinal walls 26 and the lateral wall 28 having the forwardly descending inclination. For example, the lateral wall 28, which has been explained above as being composed of the wall pieces 30 and 32, may be formed of a single plate member. In addition, placement layout and the shape of the grille elements 22 may be changed as appropriate.

REFERENCE SIGNS LIST 10 vehicle, 12 grille opening, 20 front grille, 22 grille element, 26 longitudinal wall, 28 lateral wall, 30 first wall piece, 32 second wall piece.

The invention claimed is:

1. A front grille, comprising:
 a plurality of grille elements arranged in a vehicle width direction and in a vertical direction so as to form a mesh pattern, wherein
 each of the plurality of grille elements comprises,
 a pair of longitudinal walls extending along the vertical direction, the longitudinal walls being spaced from each other in the vehicle width direction; and
 a lateral wall configured to connect lower ends of the pair of longitudinal walls to each other,
 wherein the lateral wall has a forwardly descending inclination with a front end being located lower than a rear end, and
 wherein vertical dimensions of the plurality of grille elements vary depending on vertical positions of the grille elements in the front grille.

2. The front grille according to claim 1, wherein the lateral wall comprises a plurality of wall pieces connected at an angle to each other.

3. The front grille according to claim 2, wherein the lateral wall comprises a first wall piece extending substantially along the vehicle width direction, and a pair of second wall pieces respectively extending from both ends, in the vehicle width direction, of the first wall piece along an oblique upward direction.

4. The front grille according to claim 1, wherein inclinations of the longitudinal walls of the plurality of grille elements relative to a plumb line are varied depending on positions of the grille elements in the vehicle width direction within the front grille.

5. The front grille according to claim 1, wherein the plurality of grille elements are arranged in a staggered pattern in which, among the plurality of grille elements, grille elements located in a single tier are connected to grille elements in a lower tier located one tier below the single tier in such a manner that an upper end of a longitudinal wall of each of the grille elements in the lower tier is connected to a substantial center of a lateral wall of each of the grille elements in the one tier.

6. The front grille according to claim 1, wherein the front grille is composed of one plate member in which all of the plurality of grille elements are connected.

7. A front grille, comprising:
 a plurality of grille elements arranged in a vehicle width direction and in a vertical direction so as to form a mesh pattern, wherein
 each of the plurality of grille elements comprises,
 a pair of longitudinal walls extending along the vertical direction, the longitudinal walls being spaced from each other in the vehicle width direction; and
 a lateral wall configured to connect lower ends of the pair of longitudinal walls to each other,
 wherein the lateral wall has a forwardly descending inclination with a front end being located lower than a rear end, and
 wherein inclinations of the longitudinal walls of the plurality of grille elements relative to a plumb line are varied depending on positions of the grille elements in the vehicle width direction within the front grille.

8. The front grille according to claim 7, wherein the lateral wall comprises a plurality of wall pieces connected at an angle to each other.

9. The front grille according to claim 8, wherein the lateral wall comprises a first wall piece extending substantially along the vehicle width direction, and a pair of second wall pieces respectively extending from both ends, in the vehicle width direction, of the first wall piece along an oblique upward direction.

10. The front grille according to claim 7, wherein the plurality of grille elements are arranged in a staggered pattern in which, among the plurality of grille elements, grille elements located in a single tier are connected to grille elements in a lower tier located one tier below the single tier in such a manner that an upper end of a longitudinal wall of each of the grille elements in the lower tier is connected to a substantial center of a lateral wall of each of the grille elements in the one tier.

11. The front grille according to claim 7, wherein the front grille is composed of one plate member in which all of the plurality of grille elements are connected.

\* \* \* \* \*